(12) United States Patent
Tanner et al.

(10) Patent No.: US 8,490,880 B2
(45) Date of Patent: Jul. 23, 2013

(54) PROXIMITY PAYMENT DEVICE WITH ACTIVE SWITCH

(75) Inventors: Colin Tanner, Middlesex (GB); Duncan Garrett, London (GB); David A. Roberts, Warrington (GB)

(73) Assignee: MasterCard International Incorporated, Purchase, NY (US)

( * ) Notice: Subject to any disclaimer, the term of this patent is extended or adjusted under 35 U.S.C. 154(b) by 212 days.

(21) Appl. No.: 12/979,514

(22) Filed: Dec. 28, 2010

(65) Prior Publication Data

US 2012/0160921 A1 Jun. 28, 2012

(51) Int. Cl.
*G06K 19/06* (2006.01)

(52) U.S. Cl.
USPC .......................................... 235/492; 235/487

(58) Field of Classification Search
USPC .................. 235/492, 487; 340/10.51; 705/41, 705/14.73; 39/492, 487
See application file for complete search history.

(56) References Cited

U.S. PATENT DOCUMENTS

| | | | | |
|---|---|---|---|---|
| 8,157,178 | B2* | 4/2012 | Dewan et al. | 235/492 |
| 2004/0124248 | A1* | 7/2004 | Selker | 235/492 |
| 2008/0011859 | A1* | 1/2008 | Phillips | 235/487 |
| 2008/0065492 | A1* | 3/2008 | Halbur et al. | 705/14 |
| 2008/0149735 | A1* | 6/2008 | Kozlay | 235/492 |
| 2010/0026468 | A1* | 2/2010 | Nyalamadugu et al. | 340/10.51 |
| 2011/0282753 | A1* | 11/2011 | Mullen et al. | 705/14.73 |

* cited by examiner

*Primary Examiner* — Allyson Trail
(74) *Attorney, Agent, or Firm* — Buckley, Maschoff & Talwalkar LLC

(57) ABSTRACT

An identification token includes a body and an RFID IC embedded in the body. An antenna is also embedded in the body and is coupled to the RFID IC. A control integrated circuit (CIC) is embedded in the body and coupled to the antenna. A sensor is embedded in the body and is coupled to the CIC. The sensor is actuatable by a user of the identification token.

19 Claims, 7 Drawing Sheets

PROXIMITY PAYMENT DEVICE WITH ACTIVE SWITCH

BACKGROUND

Proximity payment cards or devices are in widespread use. A well known standard for such cards has been promulgated by MasterCard International Incorporated, the assignee hereof, and is referred to as "PayPass". Proximity payment devices typically include a radio frequency identification (RFID) integrated circuit (IC) embedded in a card-shaped plastic body. An antenna is also embedded in the card body. The antenna allows the device to receive a power signal from a point of sale terminal. The antenna is also used by the RFID IC to transmit the payment device account number, and possibly other information as well, to a point of sale (POS) terminal.

It has been proposed to include in a proximity payment card a switch that may be actuated by being pressed by the cardholder's finger. Actuation of the switch may complete a circuit between the RFID IC and the antenna to allow the card to receive the power signal from the POS terminal. With this arrangement, the card is normally disabled (i.e., when the switch is not actuated), but can be enabled by actuating the switch when it is desired to present the card to the POS terminal. Because the card is normally disabled, it may be immune from attempts to surreptitiously interrogate the card in order to obtain the payment card account number for fraudulent purposes.

Unfortunately, many switching arrangements proposed for use in such proximity payment devices require modification of the RFID IC (e.g., such as to incorporate contacts and circuits for a switch). For example, many PayPass chips are becoming increasingly small in size and it is difficult to reliably or cost-effectively attach the antenna connections. Adding additional connections can be difficult and expensive. Further, many switching technologies suitable for inclusion in the body of a card do not provide a perfect on/off function. In their "off" state, some power and signal may pass through the switch sufficient to power the RFID device. In their "on" state, there may be power or signal degradation which significantly reduces the operating range of the RFID device.

It would be desirable to provide a switching mechanism that is separate from the RFID IC, allowing improved switch control using existing RFID ICs and technology.

DETAILED DESCRIPTION

In general, and for the purpose of introducing concepts of embodiments of the present specification, a control integrated circuit is provided which is embedded in a proximity device. The control integrated circuit provides switching to control the provision of a signal to an RFID IC which is also embedded in the proximity device. The control integrated circuit and the RFID IC are coupled to an antenna embedded in the proximity device.

Pursuant to some embodiments, an active switch or control circuit may be provided that is separate from the RFID IC itself. In embodiments where a contact plate is present in the design of a proximity payment device, the active switch may be integrated into a contact interface module, allowing all functionality to be integrated into the proximity payment device in a single manufacturing operation. In such embodiments, the switch may be connected to other connections on an RFID IC, as the contact plate module is typically relatively large compared to the size of the RFID IC itself.

Pursuant to some embodiments, the control integrated circuit of the present invention is designed with a very low capacitance (such as, for example, less than about 3 pico Farads or less). Applicants have found that such low capacitance allows the control integrated circuit to more reliably break the antenna circuit to provide full and accurate switching of the RFID IC. Further, in some embodiments, the control circuit or active switch is designed to be capable of operating with relatively high voltages that occur when introducing a break in the antenna circuit of a proximity payment device.

Figure 1:
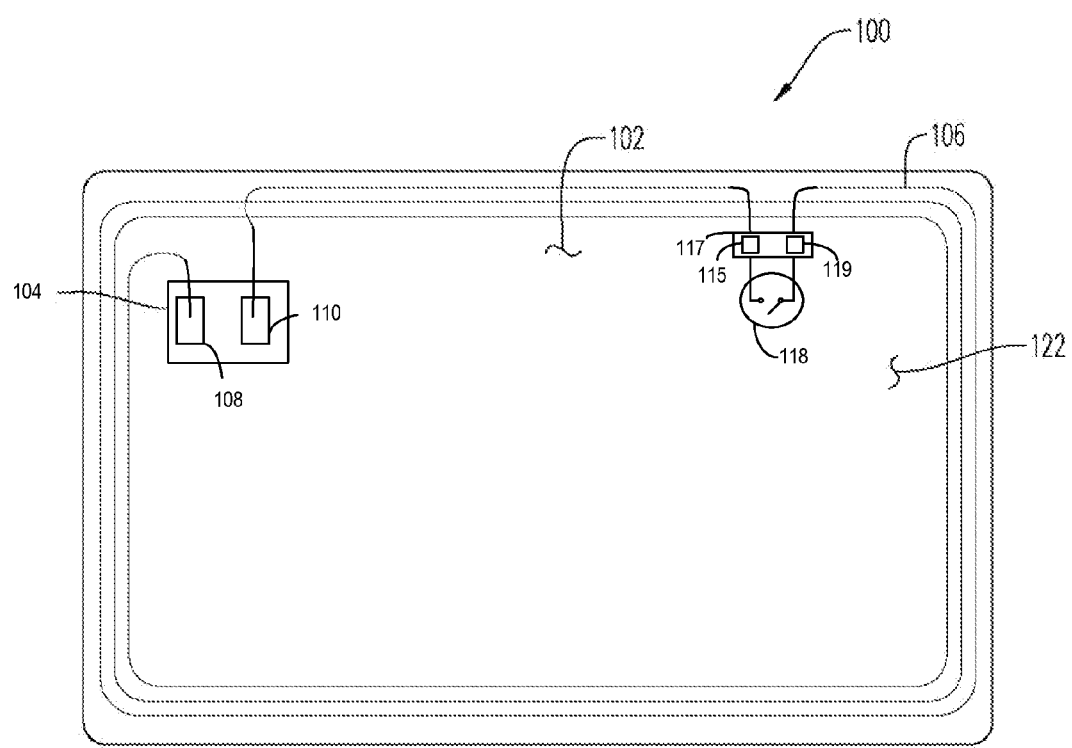
FIG. 1 is a schematic plan view of a proximity payment device according to some embodiments.

FIG. 1 is a schematic plan view of a proximity payment device 100 according to some embodiments. The proximity payment device 100 may include a card-shaped body 102, which may resemble conventional payment cards in shape and size. The card-shaped body 102 may be formed of plastic or another suitable material. The use of a card-shaped body is shown and described herein for illustrative purposes only; those skilled in the art, upon reading this disclosure, will appreciate that embodiments of the present invention may be used in conjunction with other body shapes or configurations, including (without limitation): key fobs, mobile telephones, or the like.

The proximity payment device 100 may also include an RFID IC 104. The RFID IC 104 may be mounted and/or installed in any suitable manner in the body 102 (which, as illustrated, is formed as a card-shape, and thus will be referred to herein as a "card-shaped body 102"). For example, the RFID IC 104 may be embedded (partially or completely) in the card-shaped body 102. The RFID IC 104 may be suitably designed and configured to transmit payment card account information by radio frequency signaling to a POS terminal. In general, the RFID IC 104 may be designed and configured to operate in accordance with the "PayPass" standard promulgated by MasterCard International Incorporated, the assignee hereof, although features of the present invention may be beneficially used in conjunction with other RFID devices compatible with the ISO/IEC 14443 international standard, including, but not limited to, contactless devices and electronic passports. As such, the term "proximity payment device" is used for illustrating features of the present invention, and those skilled in the art will appreciate that embodiments may be used in conjunction with other proximity devices (such as identification cards) and body shapes (such as key fobs or the like).

The proximity payment device 100 further includes an antenna 106 embedded in or otherwise mounted on the card-shaped body 102. As shown, the antenna 106 may be in the form of several loops arranged along the periphery of the card-shaped body. Alternatively, the antenna 106 may be of a different type and/or configuration. The antenna may be operative generally in accordance with the above-mentioned PayPass standard to receive interrogation and power signals (which may be the same signal) from a proximity coupling device of a POS terminal and to transmit payment device account number information and/or other information to the proximity coupling device.

In the particular embodiment shown in FIG. 1, the RFID IC 104 may have connection terminals 108 and 110. In other embodiments, the number of connection terminals may be more or fewer than the number shown in FIG. 1. The antenna 106 may be coupled to the RFID IC 104 via terminals 108, 110, each coupled to a respective end of the antenna 106. Pursuant to embodiments of the present invention, the connection of the antenna 106 to the RFID IC 104 is controlled by a sensor 118.

The sensor 118 may be embedded or otherwise mounted in or on the card-shaped body 102. In some embodiments the sensor 118 may be actuatable by being pressed by the user's finger (e.g., a switch). For example, the sensor 118 may be a pressure sensing device. In some embodiments the sensor 118 may include quantum tunneling composite (QTC). By using such a material, a very thin switch may be made which is quite suitable for being embedded in the card body, without altering the standard thickness of the resulting proximity payment device. In alternative embodiments, a sensor 118 with mechanical contacts, as disclosed in U.S. Pat. No. 6,863,220, may be employed. In still other embodiments, a membrane switch may be employed. When activated, the sensor 118 causes an electrical connection to be made with the antenna 106, thereby coupling the RFID IC 104 to be coupled to the antenna 106.

The proximity payment device 100 may also include a control integrated circuit (CIC) 117 embedded in the card-shaped body 102. The CIC 117 may be coupled to the antenna 106 and to the sensor 118 via the control connectors 115 and 119 of the CIC 117.

With this arrangement, the sensor 118 may be operated to provide an input signal to the CIC 117 which causes a circuit to be formed with the RFID IC 104 and the antenna 106. The input signal may provide an indication of a user's intention to use the proximity payment device 100 such as enabling the proximity payment device 100, disabling the proximity payment device 100, and/or selecting a payment device account number for transmission to the POS terminal (not shown) from among a number of payment device account numbers stored in the RFID IC 104. While the CIC 117 and the sensor 118 are currently illustrated as separate components, in some embodiments the CIC 117 and the sensor may comprise a single component. By providing a CIC/sensor which are separate from the RFID IC 104, embodiments allow existing designs of RFID IC devices to be used in a proximity device, thereby providing selective operation of the RFID IC without a redesign of the RFID IC. In this manner, existing RFID ICs (such as those compliant with the PayPass standards) may be used in devices with switching arrangements.

Further, pursuant to the present invention, one or more switches may be incorporated into a proximity device without significantly impacting the normal manufacturing process used by device manufacturers (as existing RFID ICs may be used). Features of the present invention may be used to implement a security feature by only allowing normal operation of the proximity device when a switch (or switches) are operated. Further, in the case of multiple switches, embodiments may allow a device user to select desired functionality (e.g., such as the selection of one or more accounts as is discussed further below in conjunction with FIG. 6), or be used to enhance security by requiring a pre-defined sequence of events to occur before certain functionality (such as use of a device in a payment transaction) to occur.

In some embodiments, the sensor or switches of the control circuit are designed to have a relatively low capacitance (such as, for example, less than or equal to approximately 3 pF). Such low capacitance helps ensure that the switch is able to effectively break the antenna circuit with normal or expected operating ranges of typical proximity payment devices. Further, in some embodiments, the sensor or switches may be integrated into a contact interface module (such as the contacts 108 and 110) by using a contact plate (not shown). In such embodiments, the switch, the contact plate, and the RFID IC 104 may be encapsulated into a payment card substrate in a single manufacturing operation.

Further, pursuant to some embodiments, sensors may be used instead of true on/off switches which can improve the usability of a device. For example, it may be possible to latch a switch or sensor once operated (e.g., press a sensor once and a switch remains in an "on" position until latched again). In some embodiments, the switch or sensor and control circuit are combined in a single module or circuit. In other embodiments, the switch/sensor is in a separate component from the control circuit.

In some embodiments, lettering (not shown in FIG. 1) or other symbols (not shown in FIG. 1) may be present on the front surface 122 of the card-shaped body 102 and/or on the rear surface (not shown in FIG. 1) of the card-shaped body 102. The proximity payment device 100 may have one or more magnetic stripes (not shown) on the card-shaped body 102 to allow the proximity payment device 100 to be read by a magnetic card reader. In addition, or alternatively, there may be embossed numbers and/or letters on the card-shaped body to indicate one or more account numbers and/or the name of the holder of the proximity payment device 100. In addition, or alternatively, non-embossed printing on the front surface 122 may indicate the account numbers and/or the holder's name. Still further, the front surface 122 of the card-shaped body 102 may carry one or more logos and/or brands, including for example the brand/logo of a national payment card association such as MasterCard International Incorporated. The brand/logo of the issuer may also be present, as well as, for example, a specific card product brand. Other conventional features that may be present on the proximity payment device 100 (though such features are not shown) are an adhesive paper strip to receive the signature of the cardholder, and a security code or the like printed on the adhesive strip.

Figure 2:
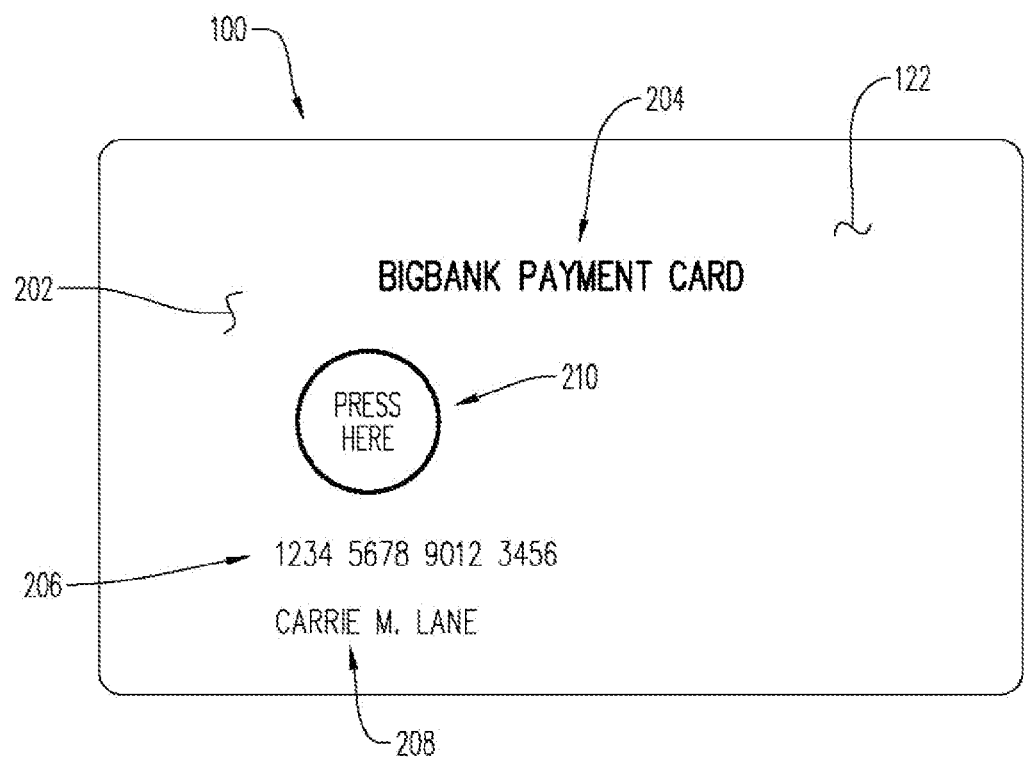
FIG. 2 is a view of a simplified example of the front surface of the device of FIG. 1.

FIG. 2 presents the visual appearance of a simplified example of the front surface 122 of the proximity payment device. As seen from FIG. 2, the front surface includes a background 202 which may be white or may be one or more other background colors. In addition, printed information is provided against the background 202. The printed information may be presented in black or in one or more other colors that contrasts with the background colors. The printed information may include the brand name and/or name of the issuer for the payment device, as indicated at 204. The printed information may further include a visual representation 206 of the payment device account number stored in the RFID IC 104, and the cardholder's name 208. In addition, the printed information includes an indication 210 of the location at which the sensor 118 (FIG. 1, not shown in FIG. 2) is located in the device body.

Figure 3A:
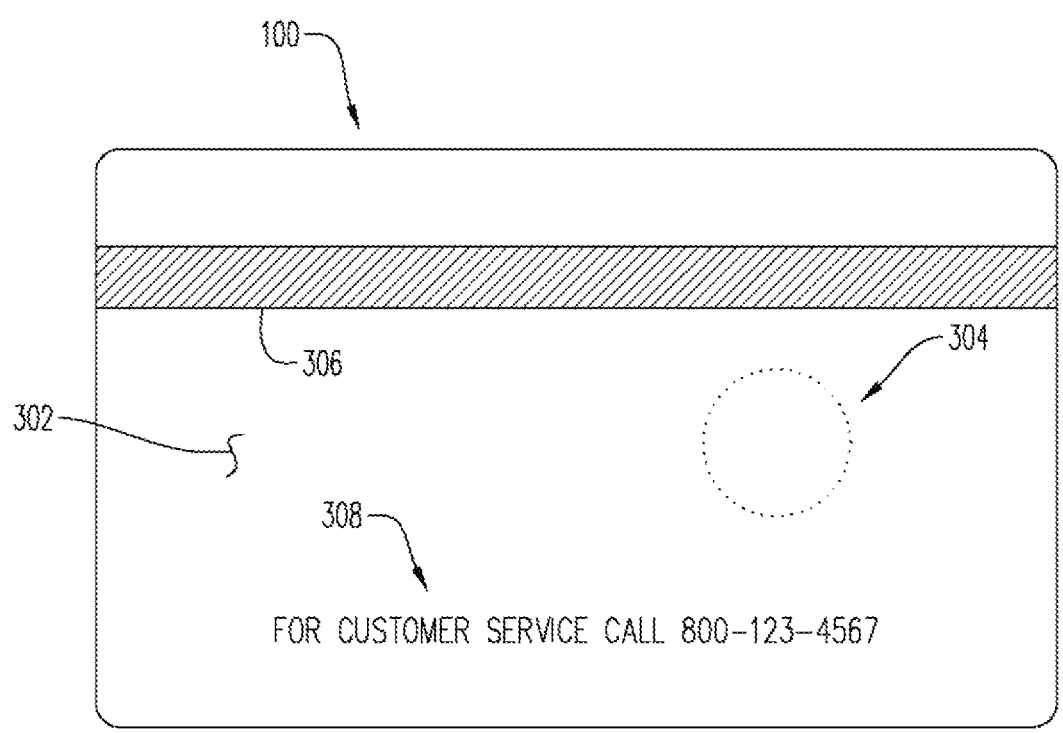
FIGS. 3A and 3B are views of a simplified example of the rear surface of the device of FIGS. 1 and 2.
Figure 3B:
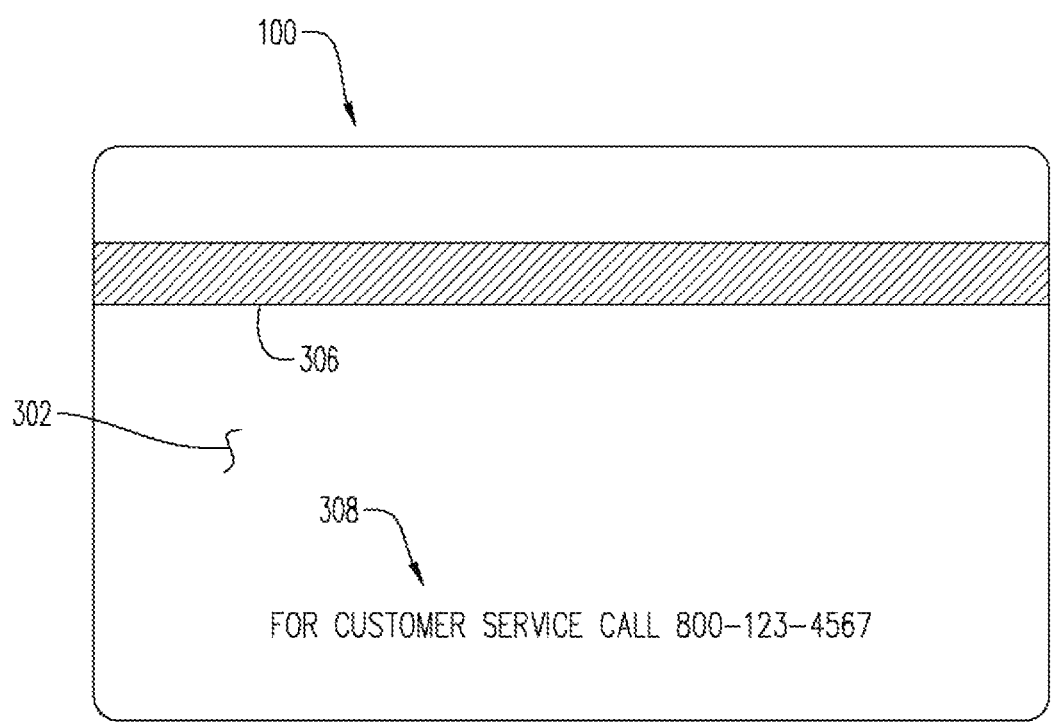

FIGS. 3A and 3B are views of a simplified example of the rear surface 302 of the device 100. The difference between these two drawings is that in FIG. 3A the location of the sensor 118 (FIG. 1) is indicated in phantom at 304, for purposes of explanation, although in practice the rear surface 302 of the device 100 may lack any indication of the sensor location, and therefore may be more accurately depicted by FIG. 3B. In some embodiments the sensor 118 may be activated either by the front of the device at indication 210 (FIG. 2) or by the rear of the device at location 304 (FIG. 3A). The rear surface may, for example, have features such as a magnetic stripe 306 or a notice 308 of a customer service toll-free telephone number.

In operation, the user presents the proximity payment device 100 to a point of sale terminal (not shown) while contacting or pressing the front surface of the device at location 210 to actuate the sensor 118. The switch, when activated, may connect one or both terminals (e.g., one terminal may or may not be permanently connected) of the antenna to the RFID IC 104 to allow it to receive sufficient power to operate. In some embodiments, the switch may provide a signal via the antenna connection to the RFID IC 104 to indicate that it has been activated. In some embodiments, once activated, the RFID IC may be powered up by an interrogation signal from the POS terminal (more specifically from a proximity coupling device included in the POS terminal). In response to the actuation of the sensor 118, the RFID IC 104 receives an indication from the CIC 117 and in response to the indication, the RFID IC 104 takes an action that it would not have taken but for the actuation of the sensor 118. Thus, the RFID IC 104 may be said to have taken an action in response to actuation of the sensor 118. For example, the RFID IC 104 may store two different payment device account numbers, and may output (transmit) one of the account numbers, in response to actuation of the sensor 118, at a time when the proximity payment device is being interrogated by a point of sale terminal. In some embodiments, if the sensor 118 is not actuated at a time when the proximity payment device is being interrogated, the RFID IC may output the other one of the two account numbers.

As another example, the actuation of the sensor 118 may be required for operation of the proximity payment device. That is, in such embodiments, either actuation of the sensor 118 is required to complete the circuit to the antenna, or the RFID IC 104, although powered by an interrogation signal received via the antenna 106, operates to transmit the account number only if the RFID IC 104 receives an indication from the CIC 117 that the sensor 118 is being actuated.

Pursuant to some embodiments, by introducing a control circuit pursuant to some embodiments, a momentary activation of the switch may permanently connect the antenna or signal to the RFID IC the user's intention. In some embodiments, the action is stored or retained until the RFID IC is completely removed from a field of a reader. In this way, embodiments provide switching functions that are cardholder friendly, as the cardholder is not required to keep the switch activated for the entire period in which the proximity payment device is in use for a transaction.

Figure 4:
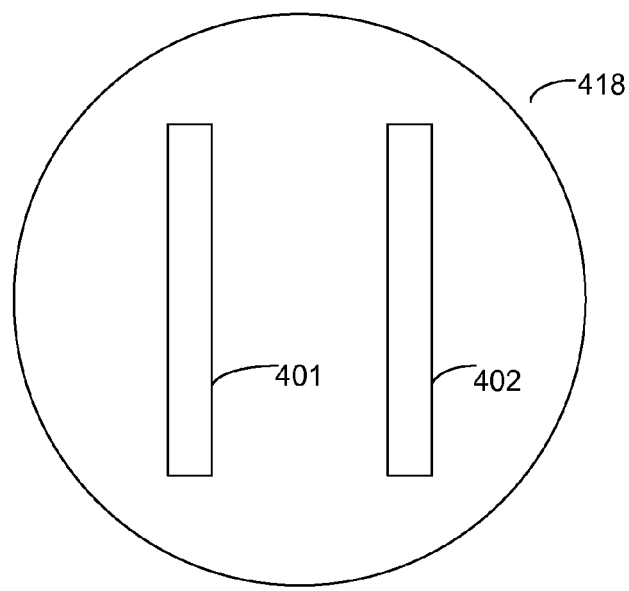
FIG. 4 is a schematic plan view of a sensor according to some embodiments.

FIG. 4 is a schematic plan view of a sensor according to some embodiments. In some embodiments, a sensor 418 may comprise a touch-sensitive switch. For example, the sensor 118 may comprise a resistance touch switch that includes two contacts 401/402 such that when a user places a finger across the two contacts 401/402, a "turned on" or "closed" state is obtained. In some embodiments, removing the finger from the contacts results in an "open" or "turned off" state.

Figure 5:
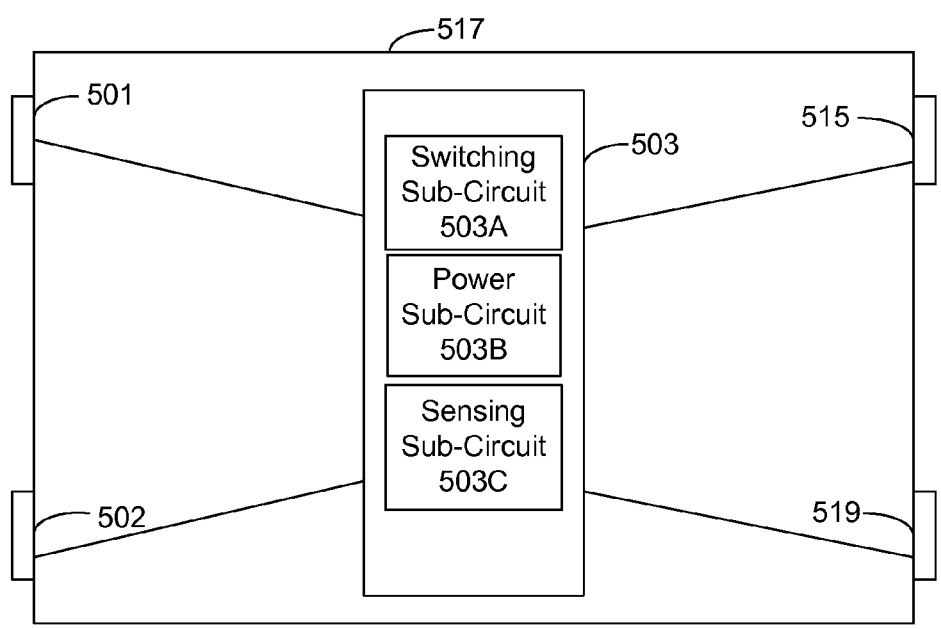
FIG. 5 is a schematic plan view of a control integrated circuit according to some embodiments.

FIG. 5 is a schematic plan view of a CIC 517 according to some embodiments. The CIC 517 may comprise one or more control terminals 501/502 to couple the CIC 517 to an antenna, such as antenna 106. The CIC 517 may further comprise two or more control connectors 515/519 to couple the CIC 517 to a sensor, such as sensor 118 of FIG. 1.

The CIC 517 may include a control circuit 503. The control circuit 502 may comprise a switching sub-circuit 503A that includes a field effect transistor, such as, but not limited to, a junction gate Field-effect transistor (JFET) or a metal-oxide-semiconductor field-effect transistor (MOSFET). The switching sub-circuit 503A may act as a switch to couple or uncouple a connection between the CIC 517 and an antenna via the control terminals 501/502. The CIC 517 may receive an indication of a "turned on" state or a "turned off" state from a sensor via the of control connectors 515/519. The control circuit 503 may further comprise a power sub-circuit 503B to provide power to the switching circuit 503A and a sensing sub-circuit 503C to determine a state of the sensor. In some embodiments, the power sub-circuit 503B may receive power through an antenna and may comprise a capacitor to store power received from the antenna.

In some embodiments, the CIC 517 may determine a number of indications or state changes to select desired functionality, such as a determination of a desired account or account number. For example, a first state change may enable a first account, a second state change may enable a second account, and a third state change may disable the proximity payment device 100. In such an embodiment, a user of a proximity device may be able to cycle through a series of available accounts. While two accounts are disclosed in the present embodiment, any number of accounts may be used.

Figure 6:
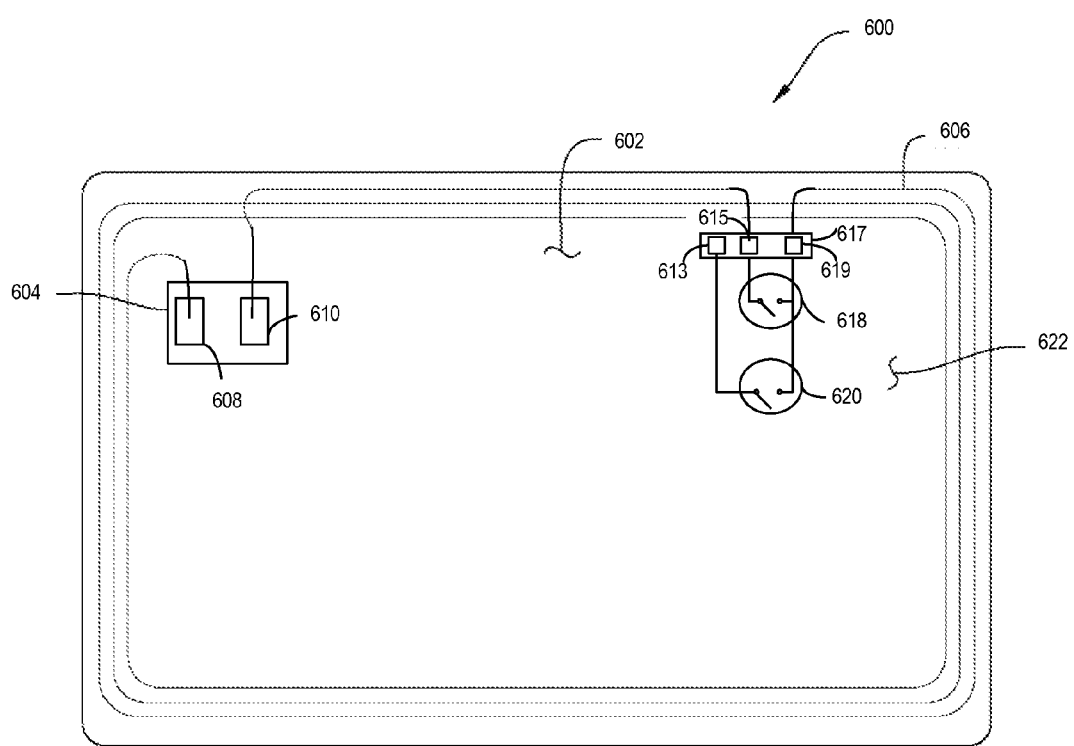
FIG. 6 is a schematic plan view of a proximity payment device according to some embodiments.

FIG. 6 is a schematic plan view of a proximity payment device 600 according to some embodiments. The proximity payment device 600 may differ from device 100 of FIG. 1 principally in that the device may have two sensors 618/620 incorporated therein rather than one. In the embodiment shown in FIG. 6, multiple sensors are used to allow the selection of different features or modes of operation of the proximity device (such as selection between one or more account numbers stored in the RFID IC 604). In particular, the proximity payment device 600 has a second sensor 620 coupled to the CIC 617 by a control connector 613 and by control connector 619, which is shared with sensor 618. The second sensor 620 may be embedded in the device body 602 and may, but need not, be of the same type as sensor 618. In the present embodiment, the CIC 617 may be coupled to antenna 606 thereby controlling the operation of the RFID IC 604 by selectively providing current to the RFID IC 604 via connection terminals 608 and 610.

In some embodiments, the RFID IC 604 may store two or more different payment device account numbers. A user may select among the account numbers by actuating one of more of the sensors while presenting the device to a POS terminal.

In operation of the proximity payment device 600, the user presents the device to a point of sale terminal while actuating one of the sensors 618/620. The RFID IC 604 is powered up by an interrogation signal from the POS terminal (more specifically from a proximity coupling device included in the POS terminal), via the connection to the antenna 606 (which is coupled to the RFID IC 604 via the switches of the sensors 618/620. In response to detection of actuation of a particular one of the switches by the sensing sub-circuit 503C, the CIC 117 may indicate to the RFID IC to take an action called for by actuation of that switch. For example, the RFID IC may store two different payment device account numbers, and may output (transmit) a first one of the account numbers the CIC 117 indicates that a first one of the switches is actuated, but would output the second account number if the CIC 117 indicates that the other one of the switches is actuated, and would not output either account number if the CIC 117 does not provide an indication (i.e., neither switch is actuated). In another embodiment, the RFID IC may store three account numbers and may output the first account number the CIC 117 indicates that only one switch is actuated, output the second account number the CIC 117 indicates that only the other switch is actuated, output the third account number if the CIC 117 indicates that both switches are actuated, and output no account number if the CIC 117 does not provide an indication or indicates that neither switch is actuated. In still another embodiment, the RFID IC may store four account numbers and may output the first account number if only one switch is actuated, output the second account number if only the other switch is actuated, output the third account number if both switches are actuated, and output the fourth account number if neither switch is actuated.

Figure 7:
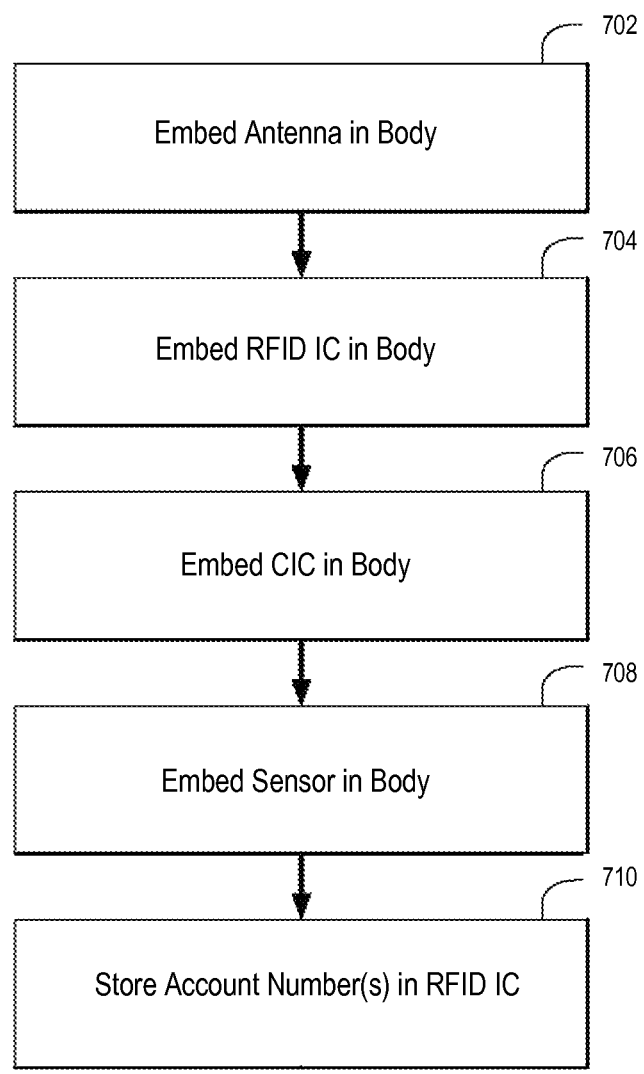
FIG. 7 is a flow chart that illustrates aspects of a process for making a proximity payment device in accordance with aspects of the present specification.

FIG. 7 is a flow chart that illustrates aspects of a process for making a proximity payment device in accordance with aspects of the present invention. The process may be used for example, to manufacture a device like the proximity payment device 100 described with reference to FIGS. 1-6.

At 702 in FIG. 7, an antenna is embedded in a card-shaped body. This may be done in a conventional manner, such as is performed to create a typical PayPass or other proximity device.

At 704, an RFID IC is embedded in the device body, and is coupled to the antenna to allow operation of the RFID IC. Pursuant to some embodiments, the RFID IC is a standard RFID IC such as a PayPass compliant IC. Embodiments allow such standard IC's to be used with switches and sensors to allow selective actuation and use of the RFID IC without redesign or manufacture of the RFID IC.

At 706, a CIC is embedded in the device body and is coupled to the antenna. At 708, one or more user-actuatable sensors (e.g., such as switches or devices operated in response to being actuated by the user's finger) is embedded in the device body, and coupled to the CIC.

At 710, at least one payment device account number may be stored, in a conventional manner, in the RFID IC. The account number(s) may be stored using a personalization process such as those commonly used to personalize and issue proximity devices (e.g., using processes such as those specified by the PayPass standard or the like).

The process of making the device may include other steps that are not specifically illustrated in FIG. 7. For example, the process may include forming and programming a magnetic stripe on the device body.

Embodiments have heretofore been described with reference to a card-shaped proximity payment device, but the teachings disclosed herein are also applicable to proximity payment devices which are not card-shaped. As used herein and in the appended claims, "proximity payment device" refers to any device, whether or not card shaped, which transmits to a point of sale terminal, by wireless transmission, a payment account number.

Although not indicated in the drawings, one or more of the proximity payment devices may have a contact interface like that of a conventional smart card that includes a contact interface.

The principles taught herein have heretofore been described in the context of proximity payment devices. Nevertheless, these teachings are also applicable to devices or the like issued by transportation systems (e.g., mass transit systems) for access to the transportation systems; to devices used to identify the holder for purposes apart from or in addition to transaction payments; and to so-called electronic passports (also known as RFID-enabled passports). As used herein and in the appended claims the term "identification token" refers to an object that serves as one or more of a proximity payment device, a transportation device, an identification card and/or an RFID-enabled passport. The term "transportation card" refers to a card or similar device used to pay, or confirm or evidence payment of, a charge for using a transportation system. The term "RFID-enabled passport" refers to an internationally recognized travel document that includes an IC and an antenna and communicates with a terminal by a wireless communication technique.

The above description and/or the accompanying drawings are not meant to imply a fixed order or sequence of steps for any process referred to herein; rather any process may be performed in any order that is practicable, including but not limited to simultaneous performance of steps indicated as sequential.

As used herein and in the appended claims, the term "embedded" includes both completely and partially embedded. As used herein and in the appended claims, a "pressure sensitive material" is a material that responds to pressure by changing its degree of electrical conductivity.

The embodiments heretofore described have included one or two user-actuatable sensors, but alternative embodiments may include three or more user-actuatable sensors. The number of sensor-location indications provided on the front surface of the card may be equal to or less than the number of user-actuatable sensors included in the card. One or more sensor-location indications may be provided on the rear surface of the card in addition to or instead of the sensor-location indications shown on the front of the card. The sensor locations need not be at the locations illustrated in the drawings.

Although the present invention has been described in connection with specific exemplary embodiments, it should be understood that various changes, substitutions, and alterations apparent to those skilled in the art can be made to the disclosed embodiments without departing from the spirit and scope of the invention as set forth in the appended claims.

What is claimed is:

1. An identification token comprising:
   a body having an antenna embedded therein;
   a radio frequency identification (RFID) integrated circuit (IC) embedded in the body, the RFID IC having a first connection terminal coupled to the antenna and a second connection terminal;
   a control integrated circuit (CIC) having a capacitance of three pico Farads or less embedded in the body, the CIC having a first control connector coupled to the second connection terminal of the RFID IC and having a second control connector coupled to the antenna; and
   a sensor embedded in the body and coupled to the CIC to control switching of a signal to the RFID IC, the sensor actuatable by a user of the identification token to couple the RFID IC to the antenna.

2. The identification token of claim 1, further comprising:
   a printed indication on the body for indicating a sensor location to the user of the identification token, wherein the body is card-shaped and has a front planar surface, and wherein the printed indication is located at the front planar surface of the card-shaped body.

3. The identification token of claim 1, wherein the CIC comprises:
   a power sub-circuit; and
   a field effect transistor to couple or uncouple a connection between the RFID IC and the antenna.

4. The identification token of claim 3, wherein if the sensor is actuated a first indication to couple the RFID IC to the antenna is received by the CIC.

5. The identification token of claim 4, wherein the RFID IC is coupled to the antenna until the CIC receives a second indication from the sensor to uncouple the RFID IC from the antenna.

6. The identification token of claim 1, wherein the RFID IC stores at least one payment card account number.

7. The identification token of claim 1, wherein the sensor comprises a switch.

8. The identification token of claim 7, wherein the switch comprises a pressure-sensitive switch.

9. The identification token of claim 7, wherein the switch comprises a touch-sensitive switch.

10. A method comprising:
embedding an antenna in a card-shaped body;
embedding a radio frequency identification (RFID) integrated circuit (IC) having a first connection terminal and a second connection terminal in the card-shaped body such that the first connection terminal is coupled to the antenna;
embedding a control integrated circuit (CIC) having a capacitance of three pico Farads or less in the card-shaped body, such that a first control connector of the CIC is coupled to the second connection terminal of the RFID IC and a second control connector of the CIC is coupled to the antenna, and wherein the CIC is configured to selectively couple the RFID IC to the antenna; and
embedding a sensor in the card-shaped body to control switching of a signal to the RFID IC, where the sensor is coupled to the CIC and is actuatable to couple the RFID IC to the antenna.

11. The method of claim 10, further comprising:
storing at least one payment card account number in the RFID IC.

12. The method of claim 10, further comprising:
indicating a sensor location to a user of the card-shaped body via a printed indication on the card-shaped body, wherein the card-shaped body comprises a front planar surface, and wherein the printed indication is located at the front planar surface of the card-shaped body.

13. The method of claim 10, further comprising:
coupling or uncoupling a connection between the RFID IC and the antenna via a field effect transistor.

14. The method of claim 10, further comprising:
actuating the sensor to indicate that the CIC is to couple the antenna to the RFID IC.

15. The method of claim 14, further comprising:
actuating the sensor to indicate that the CIC is to uncouple the RFID IC from the antenna.

16. The method of claim 10, wherein the sensor comprises a switch.

17. The method of claim 10, wherein the sensor comprises a pressure-sensitive switch.

18. The method of claim 10, wherein the sensor comprises a touch-sensitive switch.

19. The method of claim 10, wherein multiple indications from the sensor indicate a payment account number, and wherein the RFID IC stores at least two payment card account numbers.

* * * * *